(12) United States Patent
Mishra et al.

(10) Patent No.: US 12,423,893 B2
(45) Date of Patent: Sep. 23, 2025

(54) CONVERTING TEXT DATA TO VIDEO DATA USING ARTIFICIAL INTELLIGENCE TECHNIQUES

(71) Applicant: Dell Products L.P., Round Rock, TX (US)

(72) Inventors: Abhishek Mishra, Bangalore (IN); Vivek Bhargava, Bangalore (IN); Vaideeswaran Ganesan, Bangalore (IN); Rishav Sethia, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 18/196,129

(22) Filed: May 11, 2023

(65) Prior Publication Data

US 2024/0378776 A1    Nov. 14, 2024

(51) Int. Cl.
*G06T 11/60* (2006.01)
*G06F 40/205* (2020.01)
*G06F 40/242* (2020.01)
*G06F 40/247* (2020.01)
*G06F 40/40* (2020.01)

(52) U.S. Cl.
CPC ............ *G06T 11/60* (2013.01); *G06F 40/205* (2020.01); *G06F 40/242* (2020.01); *G06F 40/247* (2020.01); *G06F 40/40* (2020.01)

(58) Field of Classification Search
CPC ...... G06T 11/60; G06F 40/205; G06F 40/242; G06F 40/247; G06F 40/40
USPC .......................................................... 345/418
See application file for complete search history.

(56) References Cited

U.S. PATENT DOCUMENTS

| | | | |
|---|---|---|---|
| 2015/0121216 A1* | 4/2015 | Brown | G06N 3/006 715/705 |
| 2020/0371818 A1* | 11/2020 | Banne | G06F 40/20 |
| 2021/0192972 A1* | 6/2021 | Acharya | G10L 15/1815 |
| 2021/0327424 A1* | 10/2021 | Lee | G10L 15/22 |
| 2021/0390945 A1* | 12/2021 | Zhang | G10L 13/08 |
| 2024/0155071 A1* | 5/2024 | Gupta | H04N 7/0117 |
| 2024/0170026 A1* | 5/2024 | Wu | G06F 3/0482 |

OTHER PUBLICATIONS

Blitzz, https://blitzz.co/why-blitzz, Dec. 2, 2022.
(Continued)

*Primary Examiner* — Prabodh M Dharia
(74) *Attorney, Agent, or Firm* — Ryan, Mason & Lewis, LLP (57) ABSTRACT

Methods, apparatus, and processor-readable storage media for converting text data to video data using artificial intelligence techniques are provided herein. An example computer-implemented method includes converting text data associated with a task into multiple action statements relating to user performance of at least a portion of the task; generating video data by processing at least a portion of the multiple action statements using one or more artificial intelligence techniques; compiling at least a portion of the generated video data into at least one video sequence corresponding to at least one action workflow for the user performance of the at least a portion of the task; and performing one or more automated actions based at least in part on the at least one video sequence.

20 Claims, 8 Drawing Sheets

(56) References Cited

OTHER PUBLICATIONS

Veritone, Announcing the Launch of Veritone Voice, a New Voice as a Service Solution, https://www.veritone.com/blog/announcing-the-launch-of-veritone-voice-a-new-voice-as-a-service-solution/, May 14, 2021.
Mathers, C., The Learning Retention Pyramid: A Simple Guide, https://www.developgoodhabits.com/learning-pyramid/, Apr. 1, 2020.
Wikipedia, Scratch (programming language), https://en.wikipedia.org/w/index.php?title=Scratch (programming_language)&oldid=1147930245 , Apr. 3, 2023.
Cipia, https://web.archive.org/web/20230417212938/https://cipia.com/ , Apr. 17, 2023.
Narain, R., Smart Video Generation from Text Using Deep Neural Networks, https://www.datatobiz.com/blog/smart-video-generation-from-text/ , Dec. 29, 2021.

* cited by examiner

CONVERTING TEXT DATA TO VIDEO DATA USING ARTIFICIAL INTELLIGENCE TECHNIQUES

FIELD

The field relates generally to information processing systems, and more particularly to data conversion in such systems.

BACKGROUND

Many artifacts related to various processes and infrastructure management are assumed to be viewed and/or acted upon by human users. However, users often are unaware of how to utilize such artifacts, such as, for example, artifacts related to addressing technical issues requiring remediation. Accordingly, in such situations, users often need support resources. However, in connection with conventional support provision techniques, such support is often given in the form of technical text that can be challenging for some users to understand and/or interpret, resulting in errors and/or resource wastage.

SUMMARY

Illustrative embodiments of the disclosure provide techniques for converting text data to video data using artificial intelligence techniques.

An exemplary computer-implemented method includes converting text data associated with a task into multiple action statements relating to user performance of at least a portion of the task, and generating video data by processing at least a portion of the multiple action statements using one or more artificial intelligence techniques. The method also includes compiling at least a portion of the generated video data into at least one video sequence corresponding to at least one action workflow for the user performance of the at least a portion of the task. Additionally, the method includes performing one or more automated actions based at least in part on the at least one video sequence.

Illustrative embodiments can provide significant advantages relative to conventional support provision techniques. For example, problems associated with errors and/or resource wastage are overcome in one or more embodiments through automatically converting text data to video data using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
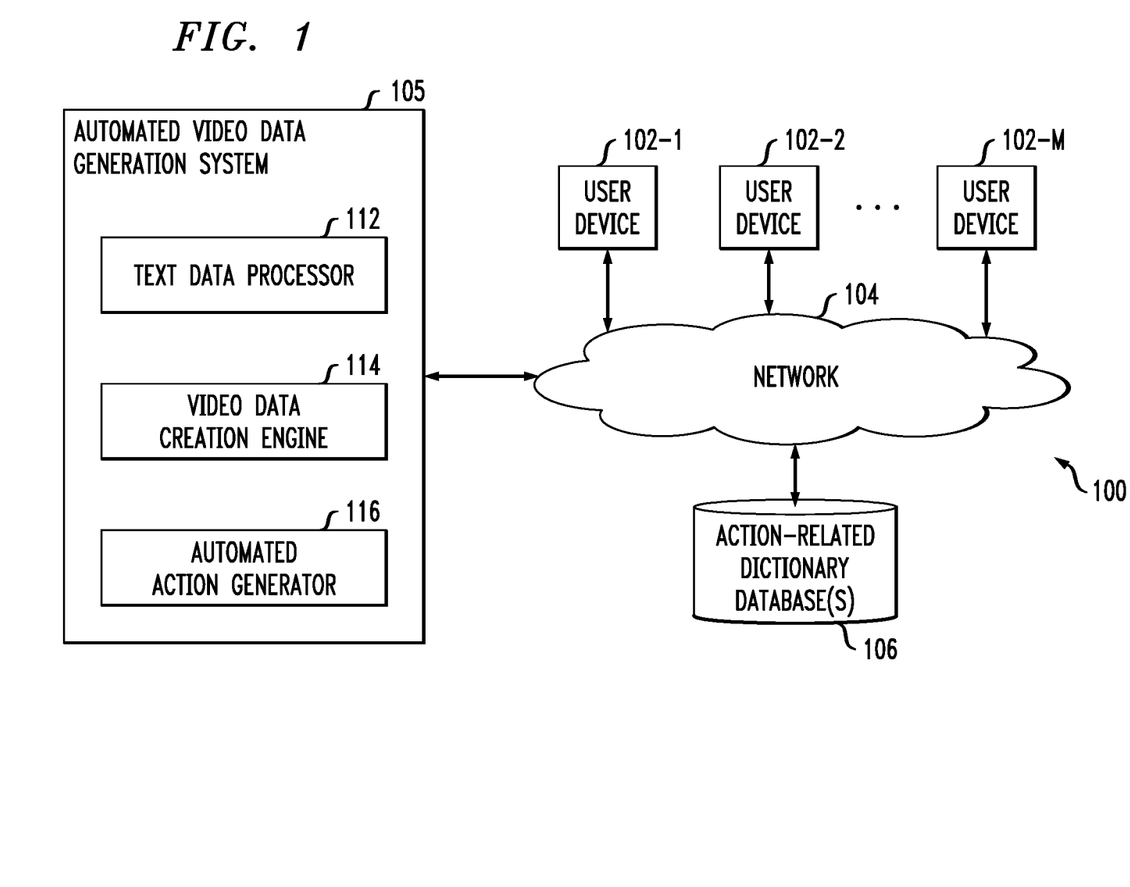
FIG. 1 shows an information processing system configured for converting text data to video data using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated video data generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated video data generation system 105 can have one or more action-related dictionary databases 106 configured to store data pertaining to visual dictionary data, entity containment dictionary data, entity name dictionary data, etc.

The action-related dictionary database(s) 106 in the present embodiment is implemented using one or more storage systems associated with automated video data generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated video data generation system 105 are one or more input-output devices, which illustratively comprise keyboards, displays or other types of input-output devices in any combination. Such input-output devices can be used, for example, to support one or more user interfaces to automated video data generation system 105, as well as to support communication between automated video data generation system 105 and other related systems and devices not explicitly shown.

Additionally, automated video data generation system 105 in the FIG. 1 embodiment is assumed to be implemented using at least one processing device. Each such processing device generally comprises at least one processor and an associated memory, and implements one or more functional modules for controlling certain features of automated video data generation system 105.

More particularly, automated video data generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated video data generation system 105 to communicate over the network 104 with the user devices 102, and illustratively comprises one or more conventional transceivers.

The automated video data generation system 105 further comprises text data processor 112, video data creation engine 114 and automated action generator 116.

It is to be appreciated that this particular arrangement of elements 112, 114 and 116 illustrated in the automated video data generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for converting text data to video data using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated video data generation system 105 and action-related dictionary database(s) 106 can be on and/or part of the same processing platform.

An exemplary process utilizing elements 112, 114 and 116 of an example automated video data generation system 105 in computer network 100 will be described in more detail with reference to the flow diagram of FIG. 7.

Accordingly, at least one embodiment includes dynamically converting computer-generated text-based messages and/or notifications into video data (e.g., one or more scripted videos), thereby reducing and/or eliminating the need for user support personnel. In such an embodiment, a user could, for example, receive, via at least one video enabled device, video-based notifications and/or visual action steps that will assist the user with carrying out one or more tasks. Also, in at least one embodiment, at least one machine and/or system provides the noted support via notifications observed via the user device.

One or more embodiments include leveraging knowledge from one or more databases to identify at least one recommended action to assist a given user with one or more particular tasks. The at least one recommended action can be converted from text form, as derived from the one or more databases, into informational and/or actional video messages.

At least one embodiment includes compiling one or more lists of terms and actions that are related to human intervention associated with one or more tasks from at least one knowledge store (which can include, for example, data including message catalogs, recommendations, articles, instructional manuals, etc.). Some additional metadata can also be derived including, for example, human positions and/or movements that are required and/or recommended for performing one or more tasks and/or operations. Such an embodiment also includes compiling at least one visual dictionary that contains image data and/or video data pertaining to entities, actions, positions and/or movements associated with performing the one or more tasks and/or operations.

Additionally, in such an embodiment, messages and/or notifications are assessed for video processing. For example, non-actionable and/or complex messages that are abstract in nature and cannot be explained physically can be excluded from video processing. Preprocessing a given message can include replacing jargon or other specialized terminology with common and/or plain language terms. Thereafter, those terms can be replaced with image data and/or video data derived from one or more visual dictionaries.

Preprocessing a given message can also include converting one or more statements into one or more action-oriented sentences. At least one embodiment can include starting with a verb and then using one or more nouns consistent with user understanding. As part of such conversion, one or more embodiments include, for failed operations, identifying one or more recovery steps in connection with one or more human-actionable entities. By way of example, in case of a failure scenario, such an embodiment can include providing instructions (e.g., plain language instructions) to the user to perform one or more recovery steps which are necessary to move forward with the given task.

At least one embodiment also includes formulating the output associated with such conversion into at least one sequence of video messages. By way merely of example and illustration, such a sequence of video messages can include video data which identifies the locations of one or more task-relevant entities and maps one or more aspects of the given task into three-dimensional (3D) positions (e.g., with respect to a server rack, a toolbox, etc.), wherein the user can be depicted, for example, as a human icon. Accordingly, one or more embodiments include specifying and/or depicting one or more components of a system, and/or one or more actions related thereto, using at least one 3D video model.

Additionally, such an example sequence of video messages can also include choreographing one or more scenes by moving the human icon between at least a portion of the task-relevant entities, reflecting one or more actions in the correct sequence and/or timing, and copying and/or replaying the corresponding actions from at least one visual dictionary. Additionally, in one or more embodiments, such an example sequence of video messages can include temporal details such as, for instance, associating a time value for each step of the given tasks in connection with a running clock.

For the above steps, data can be gathered from various resources (such as, for example, action-related dictionary database(s) 106), which can include one or more dictionaries, historical data, one or more lookup tables, etc.

Accordingly, one or more embodiments include preprocessing video-suitable messages, which can include identifying messages suitable for video presentation and/or provisioning. Video-suitable messages can include, for instance, messages which are action-oriented and involve physical action. By way merely of example, resolutions related to datacenters, particularly hardware-related tasks (e.g., involving servers, storage devices, networking devices, parts, racking and/or stacking datacenters, etc.), typically involve physical actions of the sort that are suitable for video presentation and/or provisioning. By way of further example, replacing network cables, hardware drives, SSDs, power supply units, liquid-crystal display (LCD) panels, etc., can encompass different physical actions, which can also vary from vendor to vendor and/or model to model. In order to perform such activities, a user can be shown the correct way to perform such tasks via a video sequence generated in accordance with one or more embodiments.

In at least one embodiment identifying and/or collecting video-suitable content relevant for one or more particular tasks can include scanning one or more data sources in connection with one or more keywords, one or more images, and/or one or more entity containment details. Such keywords can include, for example, keywords that indicate human-recognizable parts that are related to particular hardware (e.g., drives, disks, cards, start buttons, reset buttons, etc.) and/or will require human attention in connection with the one or more particular tasks. Additionally or alternatively, such keywords can include, for example, keywords that indicate human action (e.g., reset, press the start button, reseat, insert, remove, turn on, turn off, replace, check, etc.). In one or more embodiments, the objects (nouns) that are affected by these keywords can refer to hardware parts.

Images involved in scanning can include, for example, images related to hardware parts identified in connection with the above-noted keywords. In one or more embodiments, icons and/or clip art can be extracted from one or more image repositories associated with such identifications. Further, entity containment details involved in such scanning can be identified and extracted from data sources pertaining to the one or more particular tasks. Such data sources can indicate, for example, how experts use terms related to each other (e.g., "the disk is inside of the server," etc.).

After scanning through one or more sources of content, one or more artifacts can be created. For example, nouns associated with devices and/or components or other technological elements (e.g., disk, card, etc.) can be extracted from text sources (e.g., message catalogs, instructional manuals, etc.). Also, keywords that indicate one or more human actions (e.g., reset, press the start button, reseat, insert, remove, turn on, turn off, replace, check, etc.) can also be identified and extracted from the text sources.

Also, one or more embodiments can include generating and/or implementing at least one visual dictionary (e.g., a visual jargon dictionary), wherein a processor collects images pertaining to various aspects of one or more tasks that need to be converted into video data. Such images to be collected can include, for example, images of heterogenous elements in a network (e.g., devices, components, technology elements from various entities, etc.), as varied as possible such that the images cover a wide scope of products offered by one or more entities. Additionally, one or more embodiments can include identifying images which encompass a complete containing unit (e.g., a server, a burn factory, a burn rack, a competition brief, etc.) and tagging such images (e.g., tagging such images as containers).

Also, one or more embodiments can include generating and/or implementing at least one action verb visual dictionary. Associated with every action, such an embodiment includes determining a choreographed sequence that serves as an indicator for that action. The action sequence indicator can involve interaction between two or more entities and at least one movement (e.g., a movement that is to be carried out in a specific direction and/or location). For example, "insert a drive" would indicate an interaction between a user and a server, with the drive moving from the user to the server, and the drive disappearing from the user and appearing in the server. Replacing a drive, for example, would indicate a first drive moving from a server to a user, and then a second drive moving from the user to the server.

Additionally, at least one embodiment includes generating and/or implementing at least one entity containment dictionary, which provides the containment of various components inside at least one entity. For example, a drive is contained inside a server, and a power supply is contained inside a server. An entity containment dictionary, along with at least one entity name dictionary and at least one action verb visual dictionary, can be used and/or leveraged to create one or more video sequences.

As further detailed herein, one or more embodiments also include implementing at least one message to video processing algorithm. In such an embodiment, messages can be preprocessed for audio and/or video content. For example, a message can be divided and/or split along one or more sentence boundaries separated by punctuation marks and/or conjunctions (e.g., "and," "or," "but," etc.). By way merely of illustration a comma (",") can act as an aggregator (e.g., "the issue could be with the server, the chassis, or the switch"), and in one or more embodiments, such words are collapsed into a single token (e.g., "the issue could be with <_multi_word_>").

Also, such an embodiment can include, for each identified sentence, replacing instances of jargon or other specialized terminology with common and/or familiar terms from a dictionary (e.g., a jargon process dictionary). When such terms are replaced, multiple words (e.g., virtual disk) can be considered as a single term. Additionally, such an embodiment can also include replacing names and/or designations (e.g., Server 1, Rack 1, etc.) with at least one entity type token, and such names and/or designations can be flagged and/or saved in at least one collection.

At least one embodiment can include processing such a sentence, with replaced jargon and/or names, using at least one natural language processing (NLP) algorithm, which can identify one or more parts of speech within the sentence. For example, within a given sentence, at least one NLP algorithm can identify and/or select the primary verb, ensuring that this verb is located within a given dictionary (e.g., an action verb dictionary). In an example embodiment, when the verb has a final tag, then a statement can be created as: <noun> is <end_desired_state_name_associated_with_verb>. In such an embodiment, when creating a statement using NLP techniques, the final tag is typically appended to the verb in order to convey additional information about one or more characteristics of the verb. Also, the specific way in which a statement such as noted above is created depends on the language being used and the rules of grammar for that language. Examples of such a statement can include "system is operational," "network is restored," and "drive is functional."

When the verb does not have a final tag, one or more embodiments can include retaining the verb and the noun, and framing a sentence with the verb followed by a noun. Also, for example, if there are no more than a given number of words (e.g., five words) per sentence, then such sentences may be better suited for an audio message. Also, one or more embodiments can include providing additional information in the form, for example, of location information. Such an embodiment can include adding "location" and the name and/or designation from the "name" collection that matches the noun selected for the given sentence (e.g., "insert the optical drive into the slot," "mount the drive onto the tray," etc.).

When the verb has a failed tag, at least one embodiment includes implementing a mechanism to restore the state of the corresponding system to an operational state. Such an embodiment can include determining at least one recovery step as well as at least one corresponding "need by time" to restore the situation. To do this, such an embodiment can include extracting at least one recommended action and/or recovery step if there is a message catalog and/or past ticket associated with the message. Such recovery steps can then be output and/or played to the user after reporting the current failed state.

In determining the "need by time" for recovery, a service level agreement (SLA) can be provided by when the next job is going to start or if the job has stopped and/or failed the process. Such a start time can be derived, for example, from one or more workflows, one or more development environments, etc., through one or more programmatic interfaces. If this is not feasible, at least one embodiment can include using at least one heuristic (e.g., doubling the average time taken to resolve an issue).

In one or more embodiments, this determined "need by time" value can be referred to as T1. Additionally, a similar time value can be predicted based at least in part on the time taken to resolve related types of issues using historical data (e.g., via ticketing systems), and this time value can be referred to as T2. Accordingly, in an example embodiment, an action must have started by at least T1−T2. If this value is negative, then the action must have already started or should be escalated.

If there is more than one noun identified within a sentence, one or more embodiments include selecting the noun which is associated with at least one verb and/or the noun which is the most specific and/or smallest identifiable component. For example, consider the sentence "In the server, the virtual disk is heating up." In this example, "server" and "virtual disk" are two nouns, and of these two, "virtual disk" is more specific and/or the smaller identifiable component as compared to "server." Similarly, consider the sentence "In the server, insert the physical drive." In this example, the "insert" verb is usually associated with replaceable components such as a physical drive.

In one or more embodiments, any message that fails any of the above steps can be considered uninterpretable, and the algorithm stops. In such an instance, the corresponding user is sent a message to that extent.

As also detailed herein, at least one embodiment includes implementing message play and/or delivery techniques. Relatedly, and as used herein, a video-let refers to a video instruction set defined by one or more visual programming languages. In an example embodiment, a video-let can include a video instruction set with timings and/or temporal values incorporated. In such an embodiment, multiple video-lets can be combined and given to a video generating program, which will create a video data sequence. Such a video data sequence is then transmitted to a user as a video message.

With respect to creation of a video sequence, a first video-let is created as follows. Locations of various container entities are identified and mapped, and the user is depicted as a human icon. Verbs with success tags are replayed as is. In such an instance, the video sequence involves the user and the entity which has claimed success. In the case of other verbs, a digital timer with a countdown can be implemented using the corresponding need by time. When the time reaches zero, it can replay one or more times. In cases wherein there are more steps involved, the timer does not always go to zero, but can stop at a point equivalent to the need by time subtracted by the typical time taken to complete this step. For example, if the need by time is two hours and this step typically takes ten minutes to complete, then the timer starts from 2:00 hours and counts down to 1:50, stays for a given period of time (e.g., five seconds) and repeats from 2:00 hours.

When the verb has a failed tag, the rest of the sentences can be removed and replaced with sentences from one or more recommended actions associated with the message. Subsequent sentences are added as additional video-lets as follows. Entities that appear in the new sentence(s) are shown first (e.g., for a given duration such as ten seconds) along with the verb associated with the sentence (e.g., "insert" and the drive image). The need by timer can also be updated with the time required for the corresponding step.

In one or more embodiments, if at any stage there is a script of tagged verbs, then the script is executed with one or more contextual parameters (e.g., available as part of the message, as well as the names and/or designations used) and the output is generated and returned to a user in a message format. If the script is successful, then the video-let generated is "<tool_name> (with a script icon) and a success indicator (e.g., a green tick). If the script failed, then the video-let generated is "<tool_name> (with a script icon) and a failure indicator (e.g., a red tick). Additionally, if the need-by-time expires, then a communication can be sent to an escalation manager associated with that project.

One or more embodiments include implementing dynamic video play capability. In such an embodiment, each video-let can form a segment and/or mark. Users can control navigation, for example, by skipping segments or playing and/or pausing various parts of one or more segments. This enables users, for example, to skip segments that are familiar to the user, revise any segments if the user has doubts and/or wants reinforcement, and learn from any segments that are new to the user. Accordingly, in at least one embodiment, video-lets are dynamically machine-created, and hence marks can be inserted into at least a portion of the video-lets.

Such navigation behavior (e.g., playback, skip sequences, segments which are fast tracked, pauses, play in slow motion, etc.) can be analyzed, and one or more embodiments can include using such analysis to improve the quality of videos by, for example, appropriately skipping and/or removing certain parts for certain users. If, for example, there are instances of pauses and zoom behaviors, at least one embodiment can include creating large sized images (also referred to as big picture content) which can include overall architecture and/or design elements drawn out in an image such that the user has improved perspective and details.

Additionally, one or more embodiments include message delivery capabilities. In such a stage, an agent contacts the devices and searches for supported audio and/or video technologies on the devices. This can be pre-provisioned as the device type, device technology (e.g., video, codec, etc.), and the device transmission provider module(s) selected. Such an embodiment can include identifying technologies that are applicable in the device context, and the generated messages can be converted into native language(s) by using the user's preferred language(s) and transmitting the message to the device in accordance with the user's preferred language(s). In an example embodiment, each sentence of a message can be transmitted to the user device one at a time, which can facilitate the user acting on one action at a time.

Further, in one or more embodiments, when specific jargon and/or other specialized terminology cannot be identified and/or ascertained, or if a user attempts to repeat one or more steps, then these specific areas can be fed back into one or more search engines, and existing documentation can be parsed and sections related to these specific areas are extracted and added to the sequence of existing steps.

Figure 2:
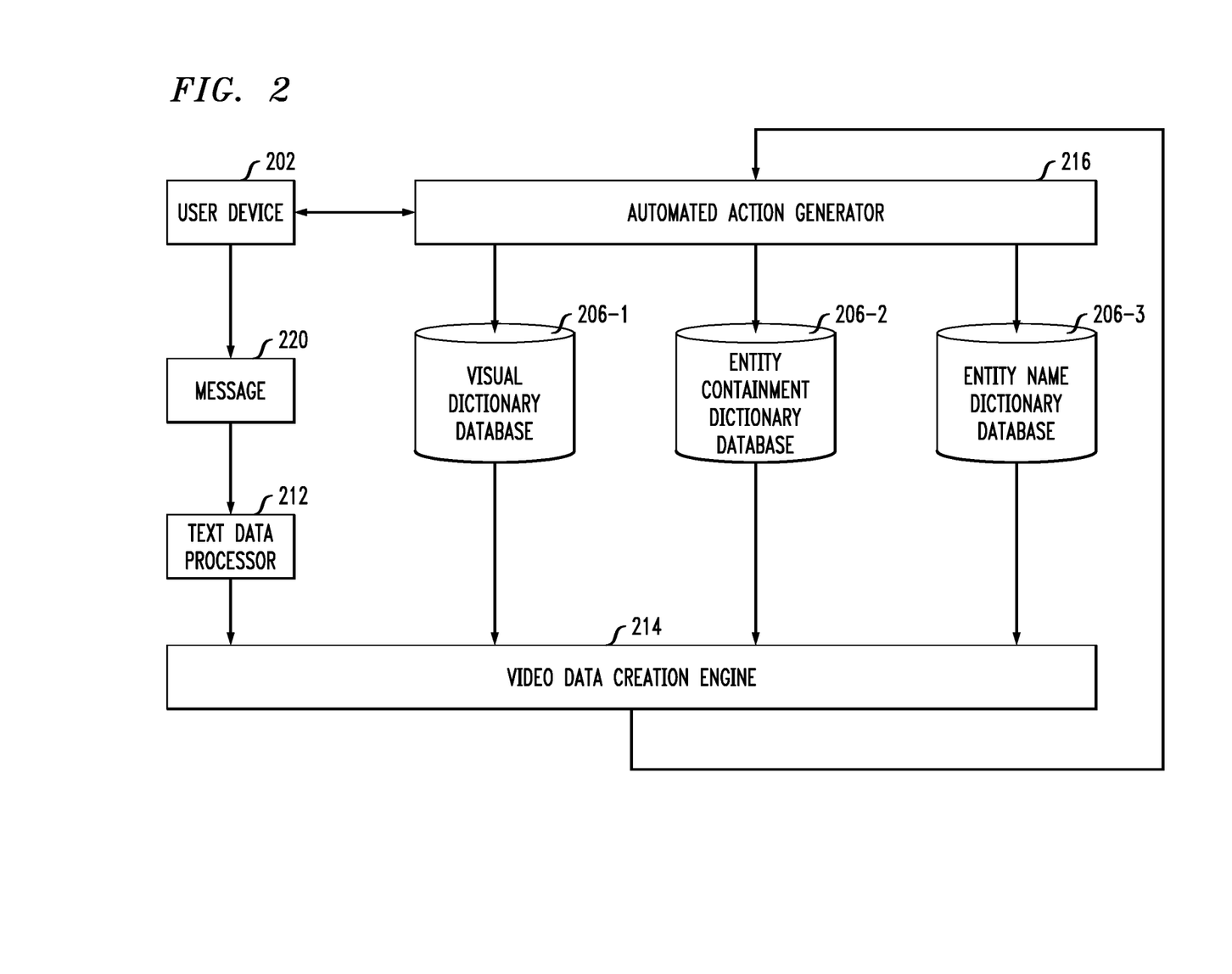
FIG. 2 shows system architecture and an example workflow associated therewith in an illustrative embodiment.

FIG. 2 shows system architecture and an example workflow associated therewith in an illustrative embodiment. By way of illustration, FIG. 2 depicts message 220, provided and/or generated by user device 202 in connection, for example, with a user request for support in connection with a given task and/or action. Message 220 is then processed by text data processor 212. Such processing can include extracting one or more recommended actions from the message, and dividing and/or splitting the one or more recommended actions into phrases with at least one noun and verb clause.

In one or more embodiments, text data processor 212 can include at least one machine learning-based part-of-speech (POS) tagging model that assigns parts of speech to each word in a given sentence. Such a model can be used to identify one or more verbs and one or more nouns in the recommended actions extracted from messages, and can divide such recommended actions into separate and/or distinct phrases based at least in part on the part-of-speech assignments.

By way merely of example and/or illustration with respect to text data processor 212, at least one embodiment can include obtaining a given dataset, preprocessing at least a portion of the text from the given dataset, and performing POS tagging on each sentence of the one or more portions of text from the given dataset, wherein the POS tagging is performed using at least one machine learning-based POS tagging model configured for and/or associated with the desired language. Such an embodiment can also include interpreting the output of the at least one machine learning-based POS tagging model, which will include a sequence of tags for each word in each sentence. At least a portion of the output can then be used for one or more natural language processing tasks, such as named entity recognition and text classification.

At least a portion of the output of text data processor 212, in conjunction with data from visual dictionary database 206-1, entity containment dictionary database 206-2, and entity name dictionary database 206-3, is then processed by video data creation engine 214. In connection with one or more embodiments, in converting text data to video data, video data creation engine 214 can preprocess video suitable messages from the text, and then generate video data by processing at least a portion of such preprocessed data using one or more text-to-video processing algorithms.

In at least one embodiment, video data creation engine 214 can process such preprocessed data using at least one deep neural network model (e.g., using such a neural network to encode and/or decode each of multiple image and/or video data frames in connection with at least one sequence-to-sequence model to predict one or more portions (e.g., pixels) of one or more future frames). Additionally or alternatively, video data creation engine can implement one or more artificial intelligence techniques including, e.g., variational autoencoders (VAEs) and/or one or more generative adversarial networks (GANs). Such example embodiments can include training such artificial intelligence techniques (e.g., at least one deep neural network model, one or more VAEs, and/or one or more GANs) on one or more datasets containing image and/or video data which are at least partially labeled (e.g., using one or more keywords associated with the image and/or video data).

For each of one or more portions of the recommended actions (e.g., all parts of the recommended actions) extracted from the message and divided by text data processor 212, video data creation engine 214 creates a video-let. In one or more embodiments, video data (e.g., in the form of one or more video-lets) are created as if a given user is viewing the target object(s) on screen, at least one operation is performed to and/or for the target object(s) in connection with on direction(s) associated with one or more verbs derived from the message. If multiple objects are included in the message, then the created video data can include containment information. Additionally, in at least one embodiment, as a user learns from the created video data, one or more portions of the video-let(s) can be replaced with one or more images and/or related image data.

As also depicted in FIG. 2, at least a portion of the video data created by video data creation engine 214 is processed by automated action generator 216. For example, such processing by automated action generator 216 can include identifying and/or discovering new and/or additional icons for unresolved nouns and/or verbs (e.g., by searching image and/or icon repositories). Further, automated action generator 216 can output at least a portion of the created video data to user device 202 and monitor and/or analyze the usage and/or engagement of the video data by user device 202. Feedback related to such analysis can then be provided to visual dictionary database 206-1, entity containment dictionary database 206-2, and/or entity name dictionary database 206-3, and used to automatically train and/or tune at least a portion of video data creation engine 214.

By way of example, such analysis can include determining one or more personalization updates for a given user. For instance, if it is determined that a given user skips certain portions of the video data (e.g., portions pertaining to particular steps in a given task and/or action), such portions of the video data can be replaced by images and/or text and/or audio instruction for that user. Additionally, if it is determined that a given user repeats one or more portions of the video data (e.g., portions pertaining to particular steps in a given task and/or action), research on more detailed depictions of those portions (e.g., steps) of the video data can be initiated and/or added to the relevant dictionary database(s) (e.g., 206-1, 206-2 and/or 206-3).

Figure 3:
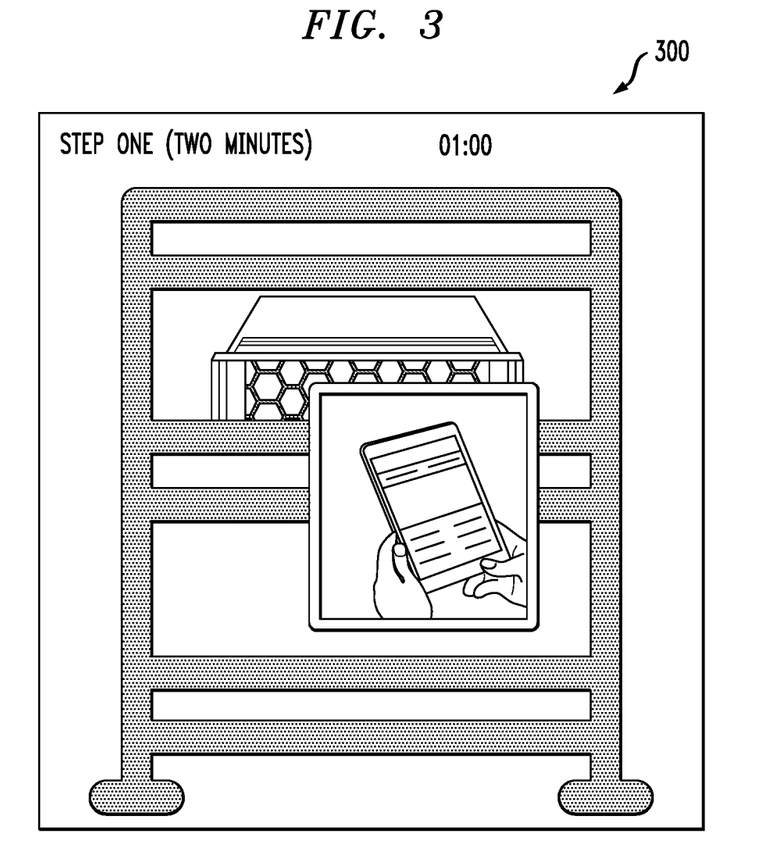
FIG. 3 shows step one of an example generated video in an illustrative embodiment.

FIG. 3 shows step one of an example generated video in an illustrative embodiment. Specifically, FIG. 3 depicts screenshot 300, which visually instructs a user to point the user's mobile device towards a given server and to launch a particular mobile application. Screenshot 300 also shows an identification of step one, an estimated duration of the step (two minutes), and a countdown clock displaying the amount of time remaining (01:00) in the estimated duration for the step.

Figure 4:
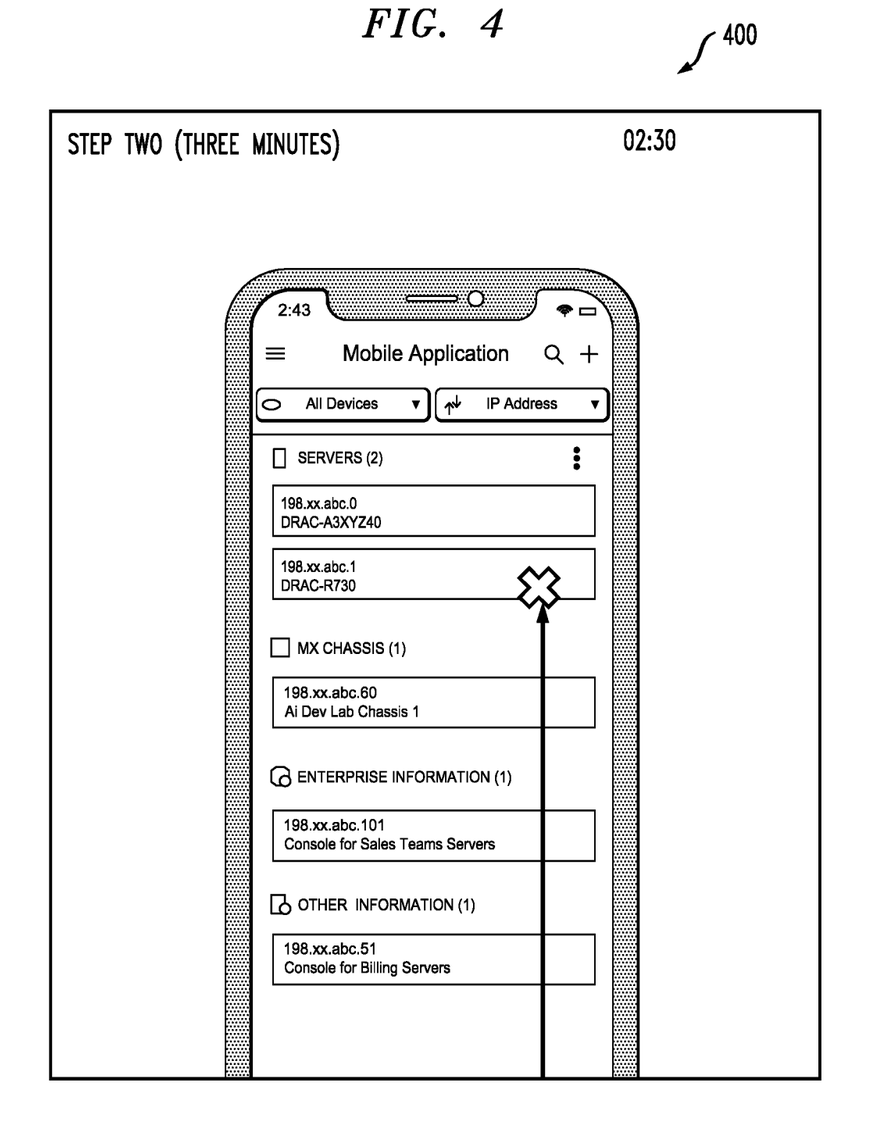
FIG. 4 shows step two of the example generated video in an illustrative embodiment.

FIG. 4 shows step two of the example generated video in an illustrative embodiment. Specifically, FIG. 4 depicts screenshot 400, which visually instructs a user to, via the launched mobile application, transition a given drive to an offline status. Screenshot 400 also shows an identification of step two, an estimated duration of the step (three minutes), and a countdown clock displaying the amount of time remaining (02:30) in the estimated duration for the step.

Figure 5:
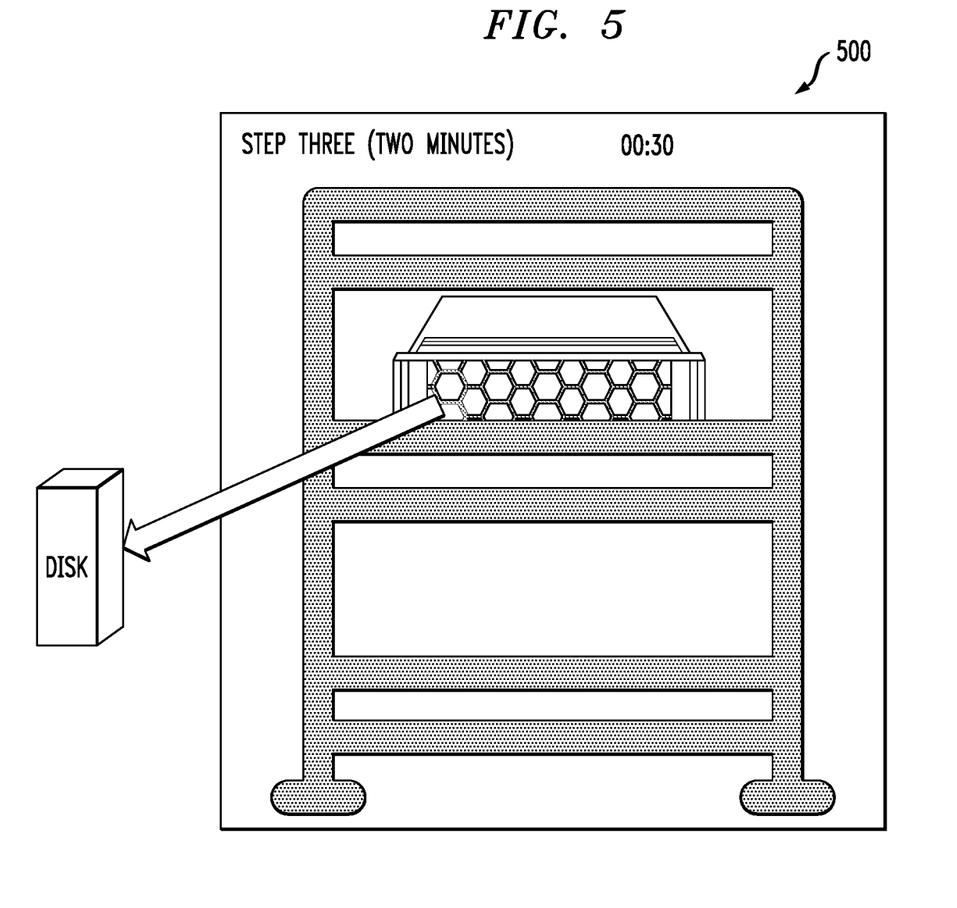
FIG. 5 shows step three of the example generated video in an illustrative embodiment.

FIG. 5 shows step three of the example generated video in an illustrative embodiment. Specifically, FIG. 5 depicts screenshot 500, which visually instructs a user to pull out a given disk from the server. Screenshot 500 also shows an identification of step three, an estimated duration of the step (two minutes), and a countdown clock displaying the amount of time remaining (00:30) in the estimated duration for the step.

Figure 6:
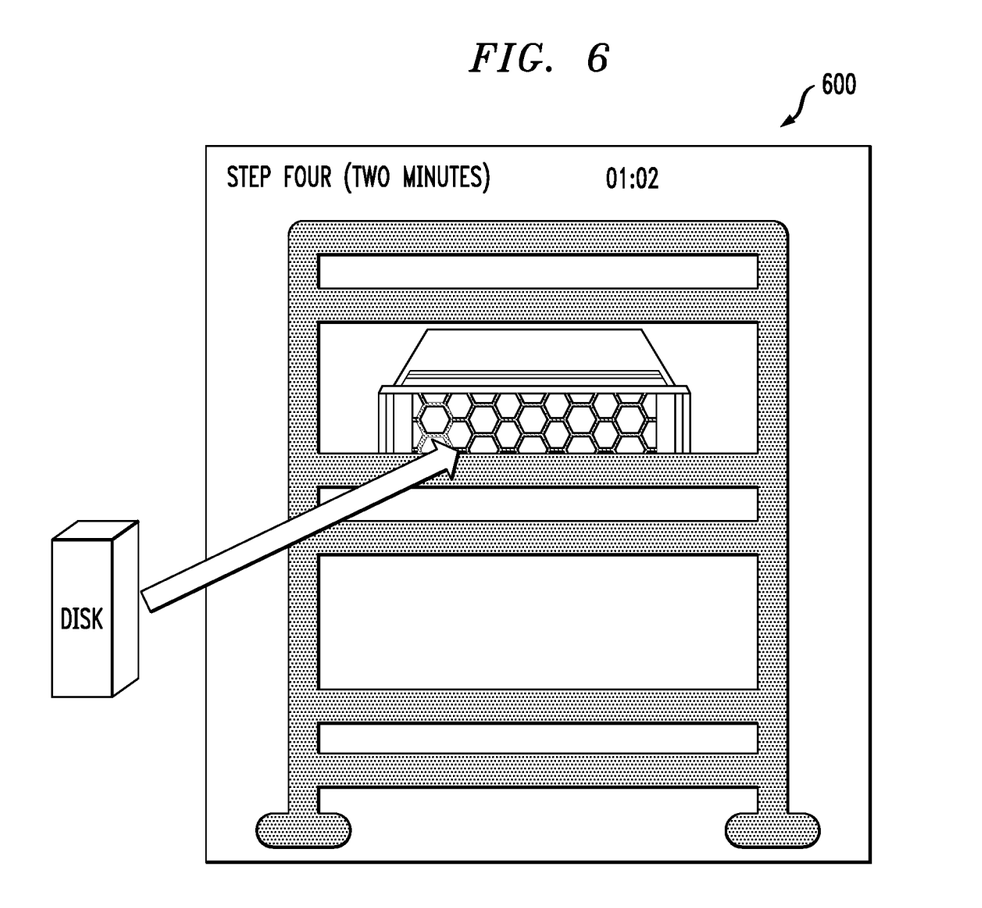
FIG. 6 shows step four of the example generated video in an illustrative embodiment.

FIG. 6 shows step four of the example generated video in an illustrative embodiment. Specifically, FIG. 6 depicts screenshot 600, which visually instructs a user to insert a new disk into the slot where the disk was removed in step three. Screenshot 600 also shows an identification of step four, an estimated duration of the step (two minutes), and a countdown clock displaying the amount of time remaining (01:02) in the estimated duration for the step.

Figure 7:
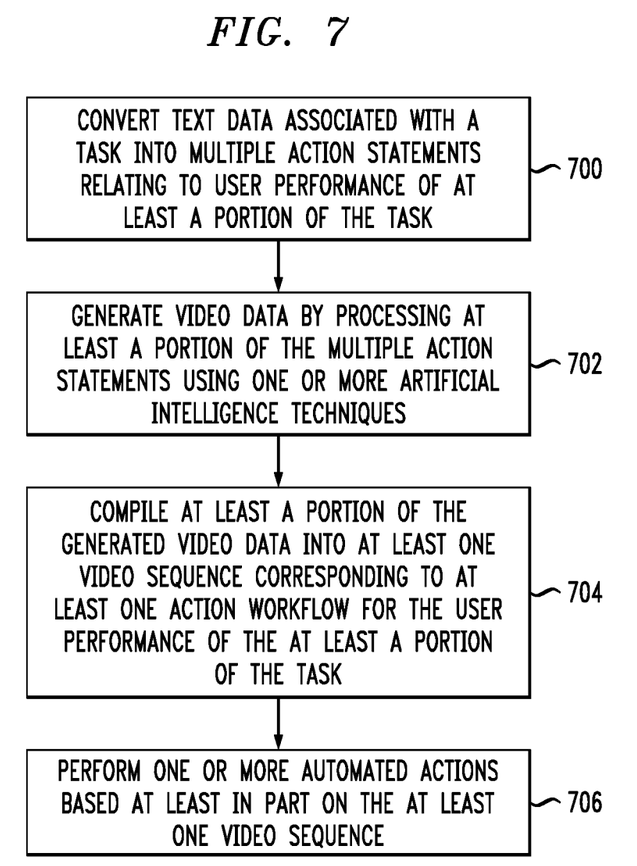
FIG. 7 is a flow diagram of a process for converting text data to video data using artificial intelligence techniques in an illustrative embodiment.

FIG. 7 is a flow diagram of a process for converting text data to video data using artificial intelligence techniques in an illustrative embodiment. It is to be understood that this particular process is only an example, and additional or alternative processes can be carried out in other embodiments.

In this embodiment, the process includes steps 700 through 706. These steps are assumed to be performed by automated video data generation system 105 utilizing elements 112, 114 and 116.

Step 700 includes converting text data associated with a task into multiple action statements relating to user performance of at least a portion of the task. In at least one embodiment, converting text data includes identifying and replacing, from the text data, one or more instances of specialized terminology using one or more natural language processing techniques. Additionally or alternatively, converting text data can include leveraging one or more domain-specific dictionaries that facilitate identifying one or more domain-specific characteristics in at least a portion of the text data and/or leveraging one or more collections of terms related to human action and one or more collections of related metadata associated with action-related positions and action-related movements. Further, in at least one embodiment, converting text data includes determining a step, among multiple steps of the task, at which at least one user has paused performance of the at least a portion of the task (e.g., such that video instructions can be generated beginning at that step and progressing through the end of the task).

Step 702 includes generating video data by processing at least a portion of the multiple action statements using one or more artificial intelligence techniques. In one or more embodiments, generating video data includes leveraging at least one visual dictionary containing visual data pertaining to one or more task-related entities, one or more task-related positions and one or more task-related movements. In such an embodiment, leveraging the at least one visual dictionary can include replacing one or more terms from the at least a portion of the multiple action statements with one or more items of visual data from the at least one visual dictionary.

Additionally or alternatively, generating video data can include mapping one or more visual entities related to the task into a three-dimensional environment. In such an embodiment, generating video data can include choreographing one or more scenes related to the user performance of the at least a portion of the task by moving at least a portion of the one or more visual entities in accordance with a sequence of one or more task-related actions. Also, in one or more embodiments, generating video data includes associating one or more temporal values with one or more portions of the video data.

Step 704 includes compiling at least a portion of the generated video data into at least one video sequence corresponding to at least one action workflow for the user performance of the at least a portion of the task. In at least one embodiment, compiling at least a portion of the generated video data into at least one video sequence includes inserting, into at least a portion of the at least one video sequence, one or more hyperlinks associated with additional information pertaining to the user performance of the at least a portion of the task.

Step 706 includes performing one or more automated actions based at least in part on the at least one video sequence. In one or more embodiments, performing one or more automated actions includes outputting at least a portion of the at least one video sequence to at least one user device. In such an embodiment, performing one or more automated actions can include analyzing usage of the at least a portion of the at least one video sequence by the at least one user device, and automatically training at least a portion of the one or more artificial intelligence techniques based at least in part on feedback related to the analyzing of the usage of the at least a portion of the at least one video sequence by the at least one user device.

Additionally, it is to be noted and acknowledged that, in one or more embodiments, the automated actions referred to in step 706 are distinct from actions associated with the action statements and the action workflow referred to in steps 700, 702 and 704.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically convert text data to video data using artificial intelligence techniques. These and other embodiments can effectively overcome problems associated with errors and/or resource wastage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
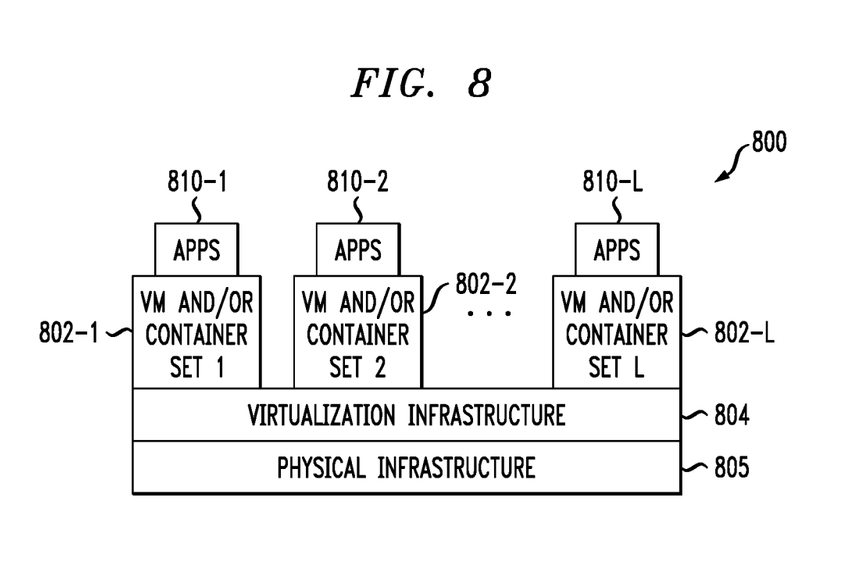
FIGS. 8 and 9 show examples of processing platforms that may be utilized to implement at least a portion of an information processing system in illustrative embodiments.
Figure 9:
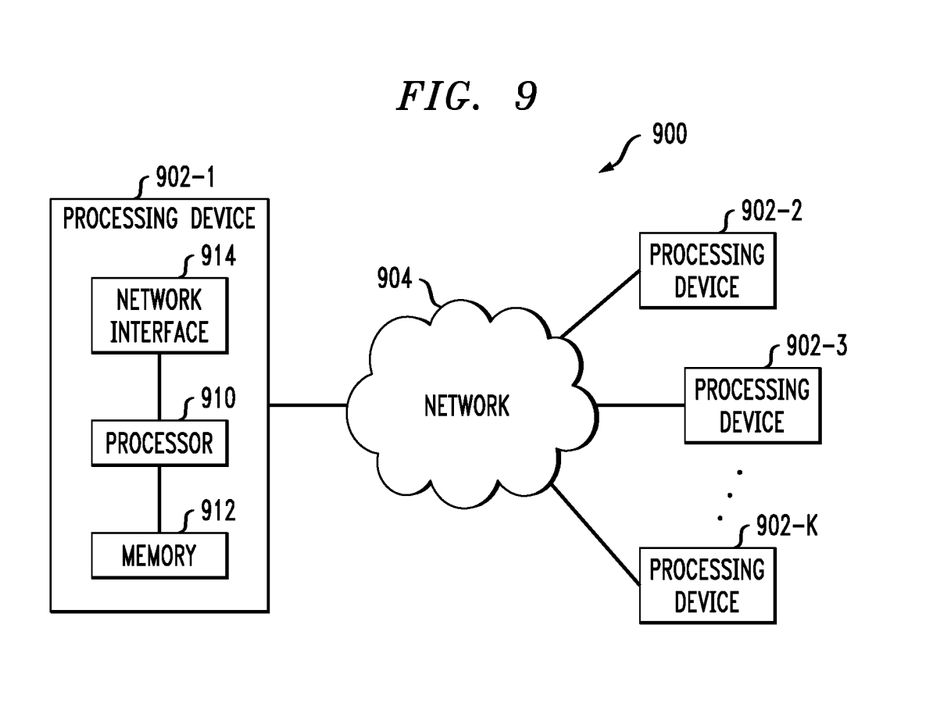

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more information processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a CPU, a GPU, a TPU, a microcontroller, an ASIC, a FPGA or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   converting text data associated with a task into multiple action statements relating to user performance of at least a portion of the task, wherein converting text data comprises determining a given step, among multiple steps of the task, at which at least one user has paused performance of the at least a portion of the task;
   generating video data by processing at least a portion of the multiple action statements, beginning with at least one of the multiple action statements corresponding to the given step of the task, using one or more artificial intelligence techniques;
   compiling at least a portion of the generated video data into at least one video sequence corresponding to at least one action workflow for the user performance of the at least a portion of the task; and
   performing one or more automated actions based at least in part on the at least one video sequence;
   wherein the method is performed by at least one processing device comprising a processor coupled to a memory.

2. The computer-implemented method of claim 1, wherein converting text data comprises identifying and replacing, from the text data, one or more instances of specialized terminology using one or more natural language processing techniques.

3. The computer-implemented method of claim 1, wherein generating video data comprises leveraging at least one visual dictionary containing visual data pertaining to one or more task-related entities, one or more task-related positions and one or more task-related movements.

4. The computer-implemented method of claim 3, wherein leveraging the at least one visual dictionary comprises replacing one or more terms from the at least a portion of the multiple action statements with one or more items of visual data from the at least one visual dictionary.

5. The computer-implemented method of claim 1, wherein performing one or more automated actions comprises outputting at least a portion of the at least one video sequence to at least one user device.

6. The computer-implemented method of claim 5, wherein performing one or more automated actions comprises analyzing usage of the at least a portion of the at least one video sequence by the at least one user device.

7. The computer-implemented method of claim 6, wherein performing one or more automated actions comprises automatically training at least a portion of the one or more artificial intelligence techniques based at least in part on feedback related to the analyzing of the usage of the at least a portion of the at least one video sequence by the at least one user device.

8. The computer-implemented method of claim 1, wherein generating video data comprises mapping one or more visual entities related to the task into a three-dimensional environment.

9. The computer-implemented method of claim 8, wherein generating video data comprises choreographing one or more scenes related to the user performance of the at least a portion of the task by moving at least a portion of the one or more visual entities in accordance with a sequence of one or more task-related actions.

10. The computer-implemented method of claim 1, wherein generating video data comprises associating one or more temporal values with one or more portions of the video data.

11. The computer-implemented method of claim 1, wherein converting text data comprises leveraging one or more domain-specific dictionaries that facilitate identifying one or more domain-specific characteristics in at least a portion of the text data.

12. The computer-implemented method of claim 1, wherein converting text data comprises leveraging one or more collections of terms related to human action and one or more collections of related metadata associated with action-related positions and action-related movements.

13. The computer-implemented method of claim 1, wherein compiling at least a portion of the generated video data into at least one video sequence comprises inserting, into at least a portion of the at least one video sequence, one or more hyperlinks associated with additional information pertaining to the user performance of the at least a portion of the task.

14. A non-transitory processor-readable storage medium having stored therein program code of one or more software programs, wherein the program code when executed by at least one processing device causes the at least one processing device:
to convert text data associated with a task into multiple action statements relating to user performance of at least a portion of the task, wherein converting text data comprises determining a given step, among multiple steps of the task, at which at least one user has paused performance of the at least a portion of the task;
to generate video data by processing at least a portion of the multiple action statements, beginning with at least one of the multiple action statements corresponding to the given step of the task, using one or more artificial intelligence techniques;
to compile at least a portion of the generated video data into at least one video sequence corresponding to at least one action workflow for the user performance of the at least a portion of the task; and
to perform one or more automated actions based at least in part on the at least one video sequence.

15. The non-transitory processor-readable storage medium of claim 14, wherein converting text data comprises identifying and replacing, from the text data, one or more instances of specialized terminology using one or more natural language processing techniques.

16. The non-transitory processor-readable storage medium of claim 14, wherein generating video data comprises leveraging at least one visual dictionary containing visual data pertaining to one or more task-related entities, one or more task-related positions and one or more task-related movements.

17. An apparatus comprising:
at least one processing device comprising a processor coupled to a memory;
the at least one processing device being configured:
to convert text data associated with a task into multiple action statements relating to user performance of at least a portion of the task, wherein converting text data comprises determining a given step, among multiple steps of the task, at which at least one user has paused performance of the at least a portion of the task;
to generate video data by processing at least a portion of the multiple action statements, beginning with at least one of the multiple action statements corresponding to the given step of the task, using one or more artificial intelligence techniques;
to compile at least a portion of the generated video data into at least one video sequence corresponding to at least one action workflow for the user performance of the at least a portion of the task; and
to perform one or more automated actions based at least in part on the at least one video sequence.

18. The apparatus of claim 17, wherein converting text data comprises identifying and replacing, from the text data, one or more instances of specialized terminology using one or more natural language processing techniques.

19. The apparatus of claim 17, wherein performing one or more automated actions comprises outputting at least a portion of the at least one video sequence to at least one user device.

20. The apparatus of claim 17, wherein generating video data comprises leveraging at least one visual dictionary containing visual data pertaining to one or more task-related entities, one or more task-related positions and one or more task-related movements.

* * * * *